Aug. 31, 1926.
J. E. SHRADER
LEAKY CONDENSER
Filed May 24, 1921
1,597,835
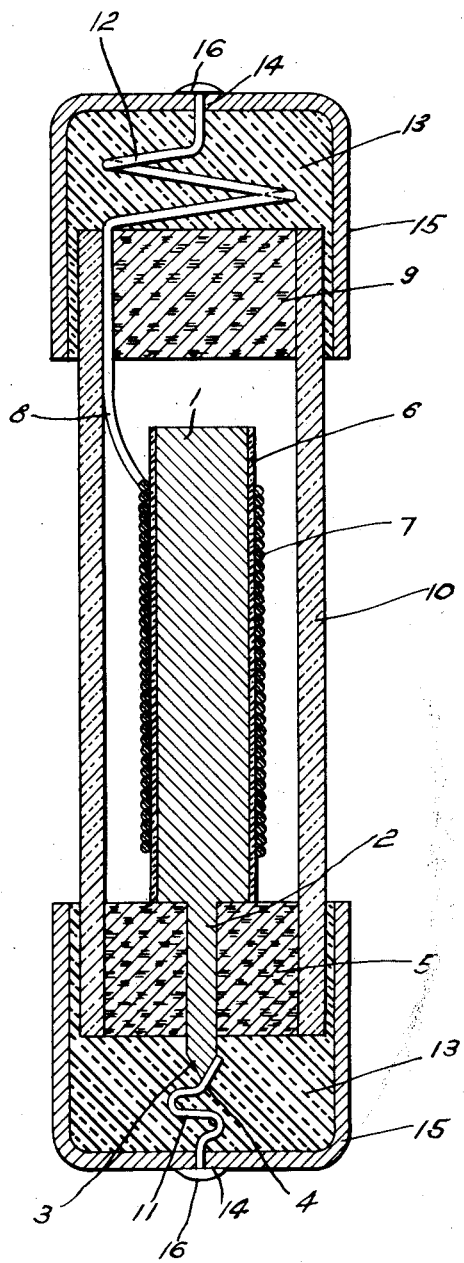
WITNESSES:
K. L. Clowes
J. E. Bierman
INVENTOR
James E. Shrader
BY
Wesley G. Carr
ATTORNEY Patented Aug. 31, 1926.

1,597,835

UNITED STATES PATENT OFFICE.

JAMES E. SHRADER, OF PITTSBURGH, PENNSYLVANIA, ASSIGNOR TO WESTINGHOUSE ELECTRIC & MANUFACTURING COMPANY, A CORPORATION OF PENNSYLVANIA.

LEAKY CONDENSER.

Application filed May 24, 1921. Serial No. 472,175.

This invention relates to condensers, more especially to condensers adapted for use in wireless systems.

In modern wireless receiving systems, there are incorporated one or more so-called vacuum tubes usually embodying three electrodes and so connected as to amplify and rectify potential impulses received by antennæ coupled in the circuit. The operation of the vacuum tube is made more sensitive by placing in the grid circuit a condenser, generally of small capacity, which is termed a grid condenser. Generally, the condenser is shunted by a suitable resistance.

The incoming oscillations from the receiving antennæ are stored up in the grid condenser charging the grid to a high negative potential, thus decreasing the plate current. After a train of oscillations has been received, it is desirable to neutralize the charge on the grid and, therefore, the grid resistance, which allows the charge on the grid to leak away after a series of oscillations has been received, is provided.

The present invention is designed to provide an improved grid condenser, it being among the objects thereof to provide a condenser structure which is simple, compact, easy to manufacture and which includes in its structure both a condenser and a grid leak.

In practising my invention, I provide a condenser electrode, usually cylindrical in form, which is covered by a suitable number of layers of insulating sheet material. A coil of wire, closely wound, is placed upon the insulating material and constitutes the second plate of the condenser. The insulating material is usually of paper which is coated on one or both sides with conducting material having a high resistance. I generally utilize India ink for this purpose. A suspension of finely divided carbon in a vehicle, such as collodion lacquer and amyl acetate is suitable.

In the accompanying drawing forming a part hereof and which illustrates one embodiment of my invention, the single figure is a central sectional view of a condenser formed in accordance with my invention.

There is provided a cylindrical rod 1 having a reduced end 2 terminating in a point 3, a wire 4 being soldered or welded to the rod 1 at point 3. The reduced portion 2 of the rod passes through and is held by an insulating member 5 generally a paraffined cork stopper. Insulating material 6, such as paper or fabric impregnated with a suitable high resistance dielectric material, such as India ink, is wound around the body portion of rod 1, and a coil of wire 7 is wound thereupon. The end 8 of coil 7 passes through a paraffined stopper 9.

Stoppers 5 and 9 are inserted in the ends of glass tube 10. The end 11 of terminal wire 4 secured to the end 3 of rod 1, and the end 12 of wire 8 are imbedded in insulating material 13 generally consisting of a molding mixture, such as a phenolic condensation product, and a filler, such as wood flour. The said wires pass through openings 14 in metallic caps 15 which enclose the ends of glass tube 10 and are held in place by the insulating material 13. The ends 16 of the wires are flattened and secured to caps 15 in any suitable manner, such as by soldering or welding.

A condenser made in accordance with the above description is simple in structure and the manipulation thereof for the production of condensers of various sizes and capacities may be readily varied. For instance, in order to change the capacity of the condenser described, it is merely necessary to add to, or substract from, the coils 7, thus adjusting the capacity of the condenser very closely. The leaky characteristic of the condenser may also be accurately controlled by varying the strength of the solution with which the fibrous material is impregnated. My condenser, after being sealed in tube 10, is permanent and is not affected by atmospheric changes, since the condenser body is enclosed in an air-tight space.

It will be obvious from the above description that my invention is not limited to the exact details herein described and that various changes in structural features of my condenser and in the method of assembly of the same may be made without departing from the principles herein set forth. For instance, caps 15 and insulating material 13 may be omitted and the electrode 1 and coil 7 have terminals formed directly on stoppers 5 and 9. The glass tube 10 need not necessarily be open at both ends but may be so formed as to seal in reduced portion 2 of electrode 1 and wire 8 of coil 7. These and other changes may be made in the details of construction of my condenser as will be apparent to those skilled in the art.

I claim as my invention:

1. A condenser comprising an electrode, a coil thereon, insulating material therebetween, conducting members secured to said electrode and said coil, a tube open at both ends, and stoppers sealing the ends thereof, said electrodes and said coil being secured to said stoppers.

2. A condenser comprising an electrode, a coil thereon, insulating material therebetween, conducting members secured to said electrode and said coil, a tube open at both ends, stoppers sealing the ends thereof, said electrodes and said coil being secured to said stoppers, and caps on the ends of said tube, said conducting members passing therethrough.

3. A condenser comprising an electrode, a coil thereon, insulating material therebetween, conducting members secured to said electrode and said coil, a tube open at both ends, stoppers sealing the ends thereof, said electrodes and said coil being secured to said stoppers, caps on the ends of said tube, and insulating material holding said caps in place, said conducting members passing therethrough.

4. A condenser comprising an electrode, a coil thereon, insulating material therebetween, conducting members secured to said electrode and said coil, a tube open at both ends, stoppers sealing the ends thereof, said electrodes and said coil being secured to said stoppers, caps on end of said tube, insulating material holding said caps in place, said conducting members passing therethrough, and terminals thereon.

5. A condenser comprising a cylindrical rod, a reduced portion on one end thereof, a stopper, said reduced portion fitting into said stopper and having a terminal thereon, insulating material impregnated with a suitable dielectric on said rod, a coil on said insulating material, a second stopper, one end of said coil passing therethrough, and a terminal on said end of said coil.

6. A condenser comprising a cylindrical rod, a reduced portion on one end thereof, a stopper, said reduced portion fitting into said stopper and having a terminal thereon, insulating material impregnated with a suitable dielectric on said rod, a coil on said insulating material, a second stopper, one end of said coil passing therethrough, a terminal on said end of said coil, a tube surrounding said structure, said stoppers being secured in the ends thereof, and conducting caps secured to the ends of said tube by insulating material, said terminals being electrically connected to said caps, respectively.

In testimony whereof, I have hereunto subscribed my name this 17th day of May, 1921.

JAMES E. SHRADER.